United States Patent
Yamada et al.

(10) Patent No.: US 10,550,888 B2
(45) Date of Patent: Feb. 4, 2020

(54) BEARING HOUSING AND ROLLING BEARING DEVICE

(71) Applicant: JTEKT CORPORATION, Osaka-shi, Osaka (JP)

(72) Inventors: Kousuke Yamada, Kashiwara (JP); Jun Matsunami, Arlington Heights, IL (US); Kazuma Okada, Yao (JP); Kazuhiro Kimura, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/202,835

(22) Filed: Nov. 28, 2018

(65) Prior Publication Data
US 2019/0170191 A1   Jun. 6, 2019

(30) Foreign Application Priority Data

Dec. 5, 2017   (JP) .................................. 2017-233130

(51) Int. Cl.
*F16C 19/06*   (2006.01)
*F16C 19/18*   (2006.01)
(Continued)

(52) U.S. Cl.
CPC .......... *F16C 33/3887* (2013.01); *F16C 19/06* (2013.01); *F16C 19/08* (2013.01);
(Continued)

(58) Field of Classification Search
CPC .......... F16C 19/06; F16C 19/08; F16C 19/18; F16C 19/184; F16C 33/3887; F16C 35/067; F16C 35/042; F16C 35/061; F16C 2226/10; F16C 2226/74; F16C 2226/76; F16C 2380/16; E21B 21/08
USPC ....... 384/499, 504, 517, 520, 523, 537, 539; 29/223, 229; 81/302; 411/518; D8/4; 24/456, 563
See application file for complete search history.

(56) References Cited

U.S. PATENT DOCUMENTS 4,549,823 A  * 10/1985  Nichting .............. F16C 27/066
                                                      384/537
5,007,313 A  *  4/1991  Jeromson, Jr. ............ B25B 7/10
                                                       29/229
(Continued)

FOREIGN PATENT DOCUMENTS

JP          01169120 A  *  7/1989  ............ F16C 35/067
JP          H07-85824 A       3/1995
(Continued)

*Primary Examiner* — Marcus Charles
(74) *Attorney, Agent, or Firm* — Oliff PLC

(57) ABSTRACT

A bearing housing in which a rolling bearing is built includes a cylindrical inner circumferential surface and an end face formed continuously with an axial end of the inner circumferential surface in an orientation perpendicular to a central axis of the inner circumferential surface. The inner circumferential surface has an annular groove that is radially outwardly recessed around an entire circumference of the inner circumferential surface. A snap ring is attached into the annular groove to reduce displacement of the rolling bearing. A recess recessed in an axial direction and extending in a radial direction is provided in the end face of the bearing housing.

7 Claims, 9 Drawing Sheets

(51) Int. Cl.
*F16C 35/06* (2006.01)
*F16C 33/38* (2006.01)
*F16C 35/067* (2006.01)
*F16C 19/54* (2006.01)
*F16C 19/08* (2006.01)

(52) U.S. Cl.
CPC .......... *F16C 19/548* (2013.01); *F16C 35/061* (2013.01); *F16C 35/067* (2013.01); *F16C 2226/74* (2013.01); *F16C 2226/76* (2013.01); *F16C 2380/16* (2013.01)

(56) References Cited

U.S. PATENT DOCUMENTS

| | | | | |
|---|---|---|---|---|
| 6,112,411 A | * | 9/2000 | Rutter | B60B 27/00 29/525 |
| 6,886,584 B2 | * | 5/2005 | Turvey | B25B 27/0028 137/15.18 |
| 7,055,413 B1 | * | 6/2006 | Wang | B25B 7/04 29/229 |
| 8,348,513 B2 | * | 1/2013 | Rusteberg | F16C 19/184 384/517 |
| 9,174,665 B2 | * | 11/2015 | Aizawa | F16B 21/183 |
| 2015/0078696 A1 | * | 3/2015 | Schmidt | F01D 25/125 384/504 |

FOREIGN PATENT DOCUMENTS

| | | | | | |
|---|---|---|---|---|---|
| JP | 2006261096 A | * | 9/2006 | ............. | H01J 9/00 |
| JP | 2013134915 A | * | 7/2013 | | |
| JP | 2014086163 A | * | 5/2014 | ............. | H01J 35/101 |
| JP | 2017007464 A | * | 1/2017 | ............. | B60K 17/30 |
| JP | 2018013230 A | * | 1/2018 | | |
| KR | 20150055870 A | * | 5/2015 | ............. | F16C 35/063 |

\* cited by examiner

FIG.4A
FIG.4B
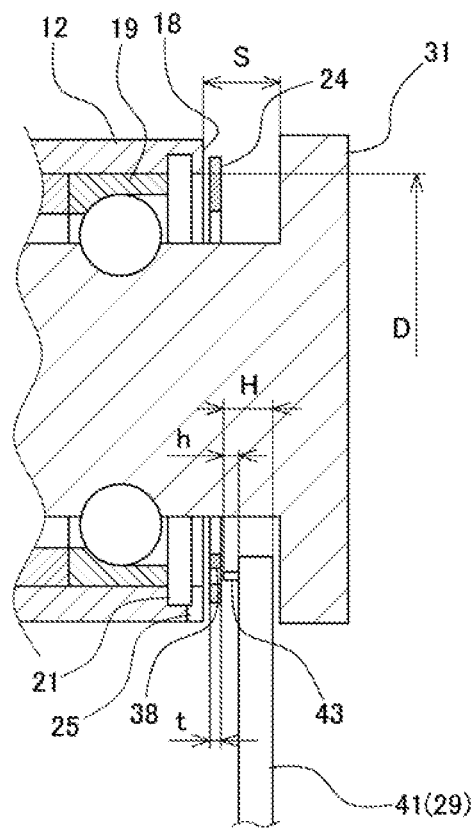
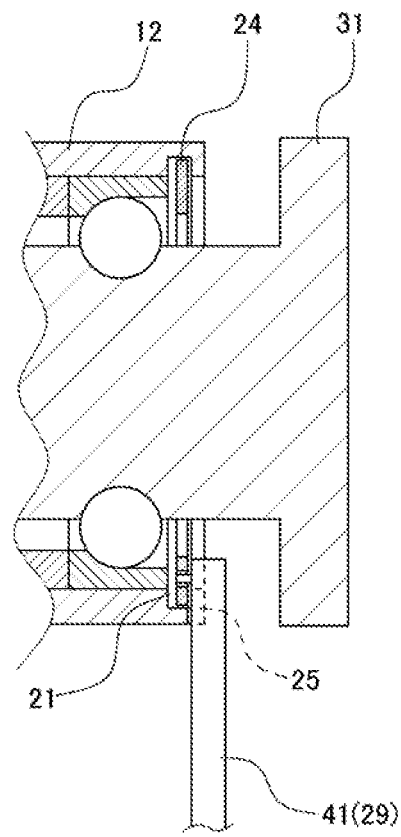

BEARING HOUSING AND ROLLING BEARING DEVICE

INCORPORATION BY REFERENCE

The disclosure of Japanese Patent Application No. 2017-233130 filed on Dec. 5, 2017 including the specification, drawings and abstract, is incorporated herein by reference in its entirety.

BACKGROUND OF THE INVENTION

1. Field of the Invention

The invention relates to a bearing housing in which a rolling bearing for supporting a rotary shaft is built, and a rolling bearing device using the bearing housing.

2. Description of the Related Art

In an X-ray tube 80 used in, for example, an X-ray computed tomography (CT) system, a rolling bearing device 81 is placed in a vacuum chamber 94 as illustrated in FIGS. 10A and 10B. FIG. 10B is an enlarged view of main parts of portion B of FIG. 10A. The inside of the vacuum chamber 94 is maintained under vacuum (e.g., $10^{-4}$ Pa or lower). An electron beam gun 93 emits an electron beam, which causes X-radiation from a target 82. The target 82, which is made of tungsten, for example, is fixed together with a rotor 92 to a shaft end of a rotary shaft 83 of the rolling bearing device 81.

The rotary shaft 83 is coaxially built in a housing 84, which has a shape of a cylinder closed at one end, and rotatably supported by a first bearing 85 and a second bearing 86. A spacer 87 is provided between an outer ring of the first bearing 85 and an outer ring of the second bearing 86. A snap ring 24 is attached to an inner circumferential surface of the housing 84 at a position on a side where the housing 84 is axially open. The snap ring 24 is fitted into an annular groove 21. The outer rings of the bearings 85 and 86 and the spacer 87 are built in the inner circumferential surface of the housing 84 by clearance fit such that the outer rings and the spacer 87 are displaceable in an axial direction. A spring 90 is mounted on an inner bottom of the housing 84. The outer rings of the bearings 85 and 86 and the spacer 87 are biased by the spring 90 in the axial direction toward or against the snap ring 24. The outer ring of the first bearing 85 and the snap ring 24 contact each other, thereby positioning the rotary shaft 83 in the axial direction.

The X-ray tube 80 emits an electron beam, which increases the temperature of the target 82 to approximately 1000° C. Heat from the target 82 conducts to the rotary shaft 83, the housing 84, and the like and causes thermal expansion thereof. The rolling bearing device 81 is configured such that the rotary shaft 83 extending in the axial direction from the housing 84 to the target 82 is short in length to reduce axial displacement of the target 82 resulting from thermal expansion of the rotary shaft 83. The outer rings of the bearings 85 and 86 are capable of displacement in the axial direction inside the housing 84. Variation in axial length, which results from temperature difference between the rotary shaft 83 and the spacer 87, between the side of the outer ring and the side of the inner ring of the first bearing 85 and the second bearing 86 can be accommodated by the displacement.

Assembly of the rolling bearing device 81 includes mounting the bearings 85 and 86 and the rotary shaft 83 to the positions illustrated in FIG. 10A, and thereafter fitting the snap ring 24 into the annular groove 21 using a setting tool (see FIG. 5). Also when performing disassembly or the like of the rolling bearing device 81, the setting tool is used as well to detach the snap ring 24 from the annular groove 21 (see Japanese Patent Application Publication No. 07-85824 (JP 07-85824 A)).

The rolling bearing device 81 is configured such that the rotary shaft 83 extending from the housing 84 to the target 82 is short in length. This makes a clearance between a flange portion 91 that fixes the target 82 and the housing 84 small. Accordingly, insufficient space left for insertion of the setting tool may cause the setting tool to interfere with and damage the flange portion 91 when attaching or detaching the snap ring 24. If the snap ring 24 and the setting tool are engaged insufficiently, the snap ring 24 may come off and rebound during attachment or detachment, and collide with an adjacent component, e.g., the housing 84. This may lead not only to damage to the adjacent components but also to rotation failure of the target 82 resulting from entry of a chipped piece, which is chipped from the housing 84 or the flange portion 91, inside the bearing. The above-described circumstances bring about disadvantages including that skill is required for an operation of attaching and detaching the snap ring 24, which makes it difficult to enhance productivity of the rolling bearing device 81.

SUMMARY OF THE INVENTION

It is an object of the invention to, even when space for inserting a setting tool for attaching a snap ring to a rolling bearing device is small, enable easy attachment of the snap ring and reduce interference between the setting tool and adjacent components.

According to an aspect of the invention, a bearing housing includes a cylindrical inner circumferential surface having an inner side, on which an outer ring of a rolling bearing is fitted into the inner circumferential surface coaxially with the inner circumferential surface, and an end face formed continuously with an axial end of the inner circumferential surface in an orientation perpendicular to a central axis of the inner circumferential surface. The inner circumferential surface has an annular groove that is radially outwardly recessed around an entire circumference of the inner circumferential surface at a position away from the end face in an axial direction on a side of the end face relative to the rolling bearing. A snap ring is attached into the annular groove to reduce displacement of the rolling bearing toward the end face. A recess recessed in the axial direction and extending in a radial direction is provided in the end face to suppress interference between the end face and a setting tool for use in attaching the snap ring.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 4A and 4B are explanatory drawings describing positions of a snap ring and a setting tool at a third step of an assembly procedure of the first embodiment;

DETAILED DESCRIPTION OF EMBODIMENTS

Figure 1:
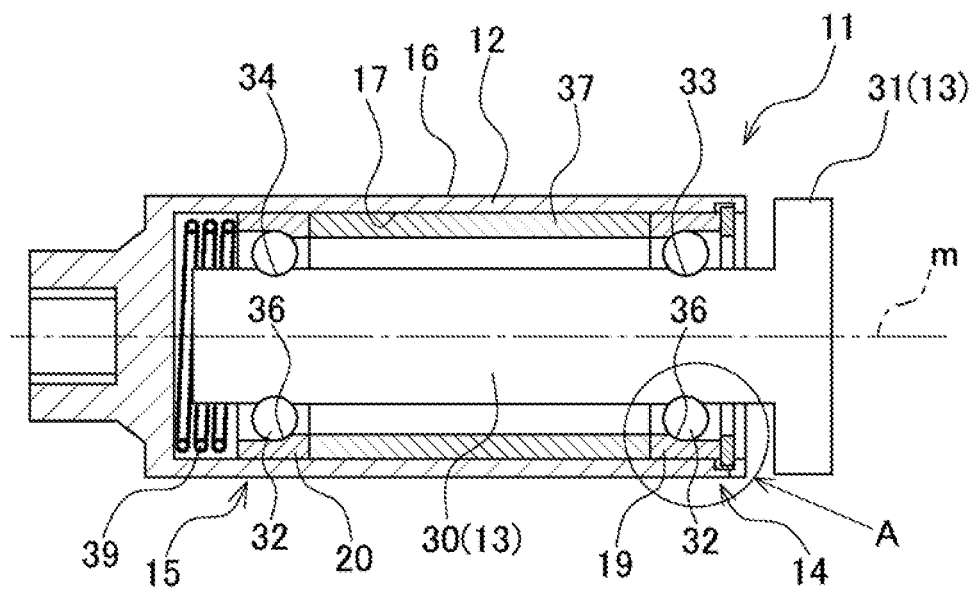
FIG. 1 is an axial sectional view of a rolling bearing device according to a first embodiment of the invention.
Figure 2:
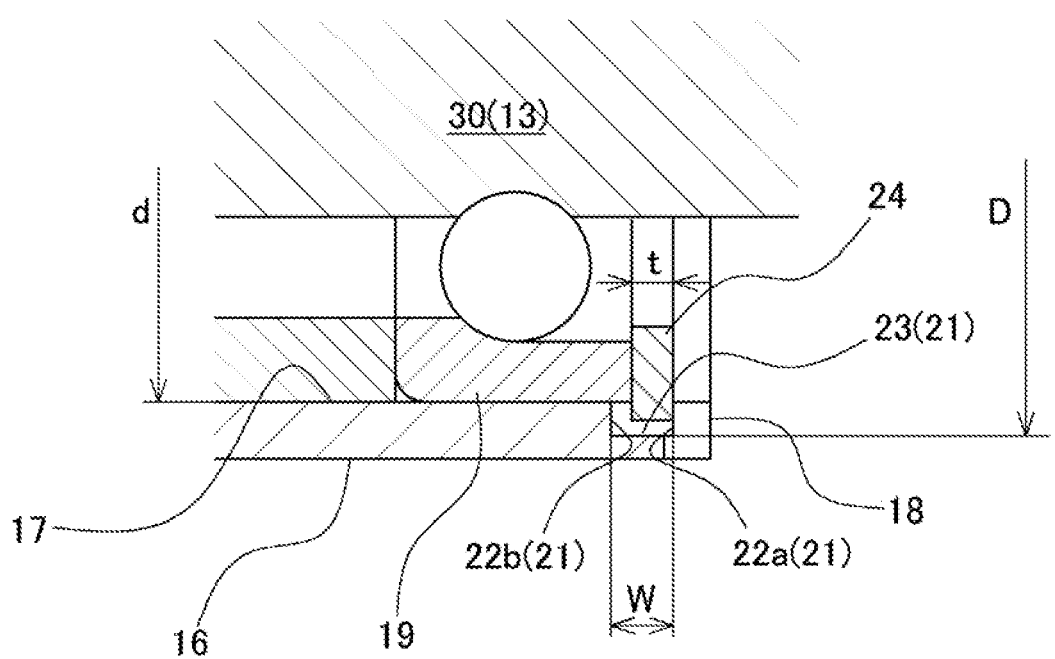
FIG. 2 is an enlarged view of main parts of a portion A of FIG. 1.
Figure 10A:
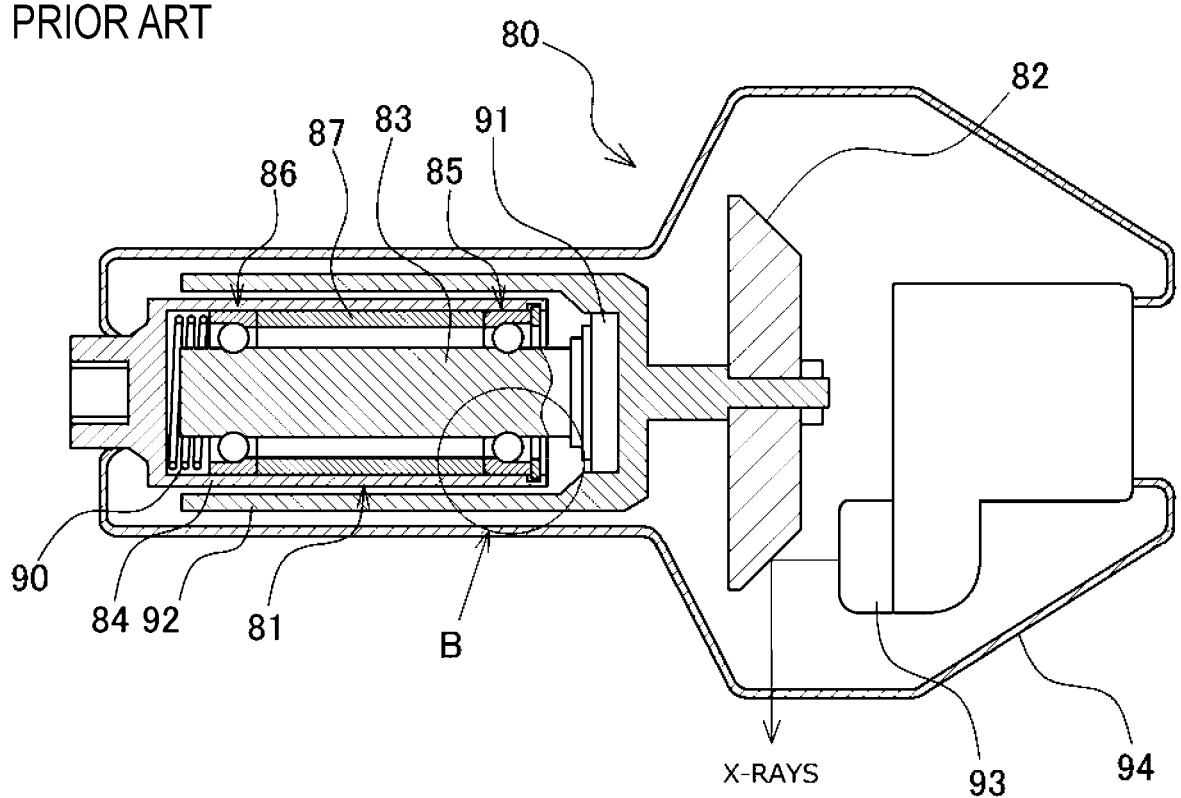
FIG. 10A is an axial sectional view of a prior art X-ray tube.
Figure 10B:
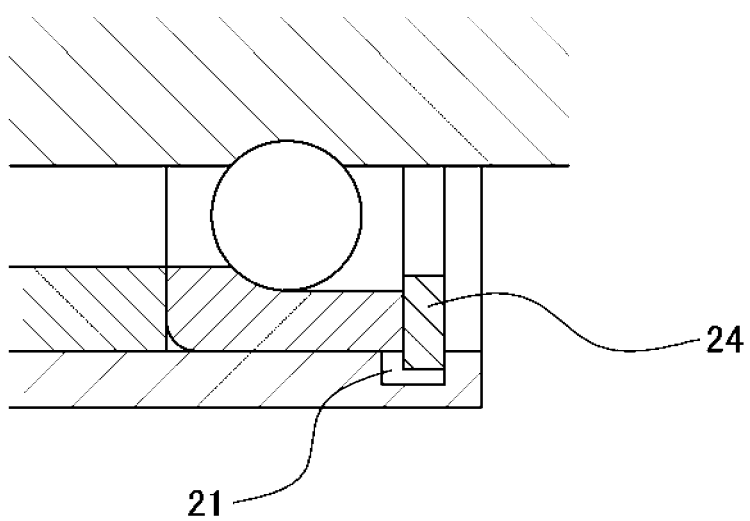
FIG. 10B is an enlarged view of main parts of portion B of FIG. 10A.

A rolling bearing device 11 according to a first embodiment of the invention is described below with reference to the drawings. FIG. 1 is an axial sectional view of the rolling bearing device 11. FIG. 2 is an enlarged view of main parts of portion A of FIG. 1. The rolling bearing device 11 is built in an X-ray tube 80 (see FIG. 10A).

The rolling bearing device 11 includes a bearing housing (hereinafter simply referred to as "housing") 12, a rotary shaft 13, a first bearing 14, and a second bearing 15. In the following description, the direction of a central axis m of the rotary shaft 13 is referred to as the axial direction, whereas the direction perpendicular to the central axis m is referred to as the radial direction.

The housing 12 has a shape of a cylinder closed at one end. In the following description, the side (the right side in FIG. 1) where the cylinder is axially open may be referred to as "the open side in the axial direction" or "the first axial side," whereas the side (the left side in FIG. 1) opposite from the open side in the axial direction may be referred to as "the bottom side in the axial direction" or "the second axial side." An outer circumferential surface 16 and an inner circumferential surface 17 of the housing 12, each of which is a cylindrical surface, are coaxial with each other. An end on the open side in the axial direction of the outer circumferential surface 16 and an end on the open side in the axial direction of the inner circumferential surface 17 are connected via an end face 18 formed perpendicularly to the central axis m. A diameter of the inner circumferential surface 17 is slightly larger than an outside diameter of an outer ring 19 of the first bearing 14 and an outside diameter of an outer ring 20 of the second bearing 15. The annular groove 21 is provided around an entire circumference of the inner circumferential surface 17 at a position axially away from the end face 18. The annular groove 21, which is rectangular in an axial cross-section, is defined by a pair of groove side faces 22a and 22b formed in an orientation perpendicular to the central axis m and a groove bottom face 23, which is a cylindrical surface coaxial with the central axis m. The groove bottom face 23 is larger in diameter than the inner circumferential surface 17. A dimension W (which is a distance in the axial direction between the pair of groove side faces 22a and 22b) in the axial direction of the annular groove 21 is set to be slightly larger than a thickness t of the snap ring 24.

Figure 3A:
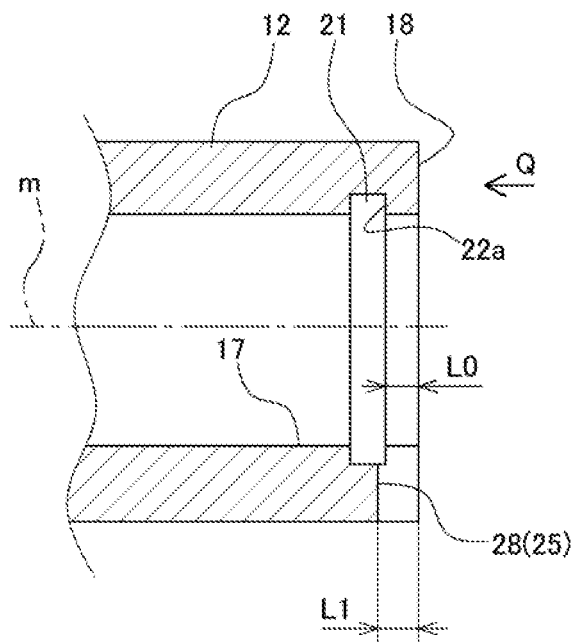
FIG. 3A is an enlarged axial sectional view of main parts of a housing alone according to the first embodiment.
Figure 3B:
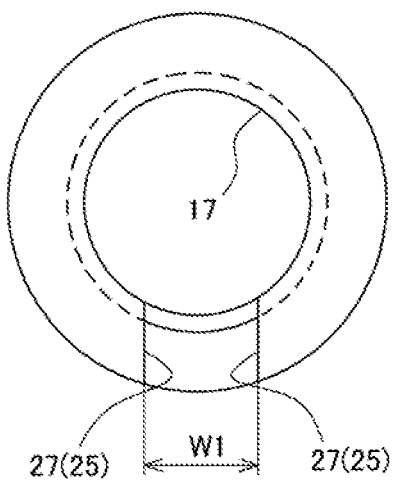
FIG. 3B is a side view of FIG. 3A as viewed in the direction of arrow Q.

FIG. 3A is an enlarged axial sectional view of main parts of the housing 12 alone. FIG. 3B is a side view of the housing 12 as viewed in the direction of an arrow Q. A recess 25, which is recessed in the axial direction, is provided at at least one circumferential position in the end face 18 of the housing 12. The recess 25 communicates with inside of the housing 12 and extends in the radial direction along the end face 18. The recess 25 is defined by a pair of side faces 27 and 27 that are parallel to a plane containing the central axis m and a bottom face 28 that is parallel to the end face 18. A depth L1 (which is a distance in the axial direction between the end face 18 of the housing 12 and the bottom face 28) of the recess 25 is larger than a distance L0 in the axial direction between the end face 18 of the housing 12 and the groove side face 22a on the open side in the axial direction of the annular groove 21. Hence, the recess 25 communicates with the annular groove 21. A width W1 (which is a clearance between the pair of side faces 27 and 27) of the recess 25 is described in detail later.

Description is made referring back to FIG. 1. The rotary shaft 13 includes a shaft portion 30 and a flange portion 31 formed in one piece. The shaft portion 30 is substantially cylindrical and has an outer circumferential surface, on which inner raceway surfaces 33 and 34, on which balls 32 roll, are formed away from each other in the axial direction. Each of the inner raceway surfaces 33 and 34 is arcuate in the axial cross-section and has a radius of curvature that is slightly larger than a radius of the balls 32. The flange portion 31, which is disk-shaped with a diameter larger than that of the shaft portion 30, is formed at a shaft end on the first axial side of the shaft portion 30 in an orientation perpendicular to the central axis m. The rotor 92 of the X-ray tube 80 and the target 82 are fixed to the flange portion 31 with a bolt (not illustrated).

The first bearing 14 and the second bearing 15 are angular contact ball bearings. The first bearing 14 is formed by the outer ring 19, the balls 32, and the inner raceway surface 33, which is formed on the rotary shaft 13. The second bearing 15 is formed by the outer ring 20, the balls 32, and the inner raceway surface 34, which is formed on the rotary shaft 13. The outer rings 19 and 20 are identical in shape and each has an outer raceway surface 36 formed on its inner side. The outer raceway surface 36 is arcuate in the axial cross-section with a radius of curvature that is slightly larger than the radius of the balls 32. The bearing 14 on the first axial side does not have a shoulder on the first axial side of the outer raceway surface 36 of the outer ring 19, but has a shoulder on the second axial side of the outer raceway surface 36 of the outer ring 19. The bearing 15 on the second axial side has a shoulder on the first axial side of the outer raceway surface 36 of the outer ring 20, but does not have a shoulder on the second axial side of the outer raceway surface 36 of the outer ring 20. Each of the bearings 14 and 15 is what is generally referred to as a "full complement" ball bearing and uses no cage. The first bearing 14 and the second bearing 15 are mounted in opposite orientations such that back faces of the outer rings 19 and 20 face each other. A spacer 37 is mounted to an area between the outer ring 19 and the outer ring 20. The spacer 37 is cylindrical and has, on each of both axial sides, an end face that is in contact with a corresponding one of the back face of the outer ring 19 and the back face of the outer ring 20.

The snap ring 24 is mounted in the annular groove 21 of the housing 12 at a position on the open side in the axial direction relative to the first bearing 14. Preferred examples of the snap ring 24 (see FIG. 5) include an eccentric C-type snap ring (for bore) or a concentric C-type snap ring (for bore) defined in JIS B2804; however, examples of the snap ring 24 are not limited thereto.

A spring 39 is mounted in an axially compressed state inside the housing 12 at a position on the bottom side in the axial direction relative to the second bearing 15. The spring 39 is axially in contact with a front face of the outer ring 20 of the second bearing 15 and with a bottom face of the housing 12. A coil spring can preferably be used as the spring 39; however, examples of the spring 39 are not limited thereto. The spring 39 can be selected from a variety of springs including a disc spring and a volute spring.

Each of the outer rings 19 and 20 and the spacer 37 is fitted into the inner circumferential surface 17 of the housing 12 by clearance fit and easily displaceable in the axial direction. Hence, the outer ring 19 of the first bearing 14, the outer ring 20 of the second bearing 15, and the spacer 37 are biased by the spring 39 in the axial direction, thereby being pressed toward or against the snap ring 24 while making tight contact with each other in the axial direction. The rotary shaft 13 is positioned in the axial direction relative to the housing 12 by the contact between the first bearing 14 and the snap ring 24. Thus, in the rolling bearing device 11, the rotary shaft 13 is mounted to the housing 12 radially inside and coaxially with the housing 12 and rotatably supported by the first bearing 14 and the second bearing 15.

A procedure for assembling the rolling bearing device 11 and advantages of providing the recess 25 in the housing 12 are described below with reference to FIGS. 4A and 4B while referring to FIG. 1. FIGS. 4A and 4B are explanatory drawings describing positions of the snap ring 24 and a setting tool 29 at a third step of the assembly procedure. FIG. 4A illustrates a state where an engaging portion 41 of the setting tool 29 is inserted between the housing 12 and the flange portion 31. FIG. 4B illustrates a state where the snap ring 24 caught and held by the setting tool 29 is mounted into the annular groove 21. Also with regard to the setting tool 29, the direction parallel to the central axis m is referred to as the axial direction.

At a first step, a sub-unit is assembled by mounting the first bearing 14 and the second bearing 15 to the rotary shaft 13. Prior to the first step, the snap ring 24 is inserted between the flange portion 31 and the first bearing 14. The spacer 37 is inserted between the first bearing 14 and the second bearing 15.

At a second step, after the spring 39 is inserted on the inner bottom of the housing 12, the sub-unit described above is axially inserted inside the housing 12 in the orientation illustrated in FIG. 1. The sub-unit is pushed in the axial direction until the outer ring 19 of the first bearing 14 is located closer to the bottom in the axial direction than the annular groove 21 is. The annular groove 21 is thus exposed at a position on the open side in the axial direction relative to the first bearing 14. Accordingly, the snap ring 24 can be attached easily. In this state, the spring 39 is compressed in the axial direction.

Figure 5:
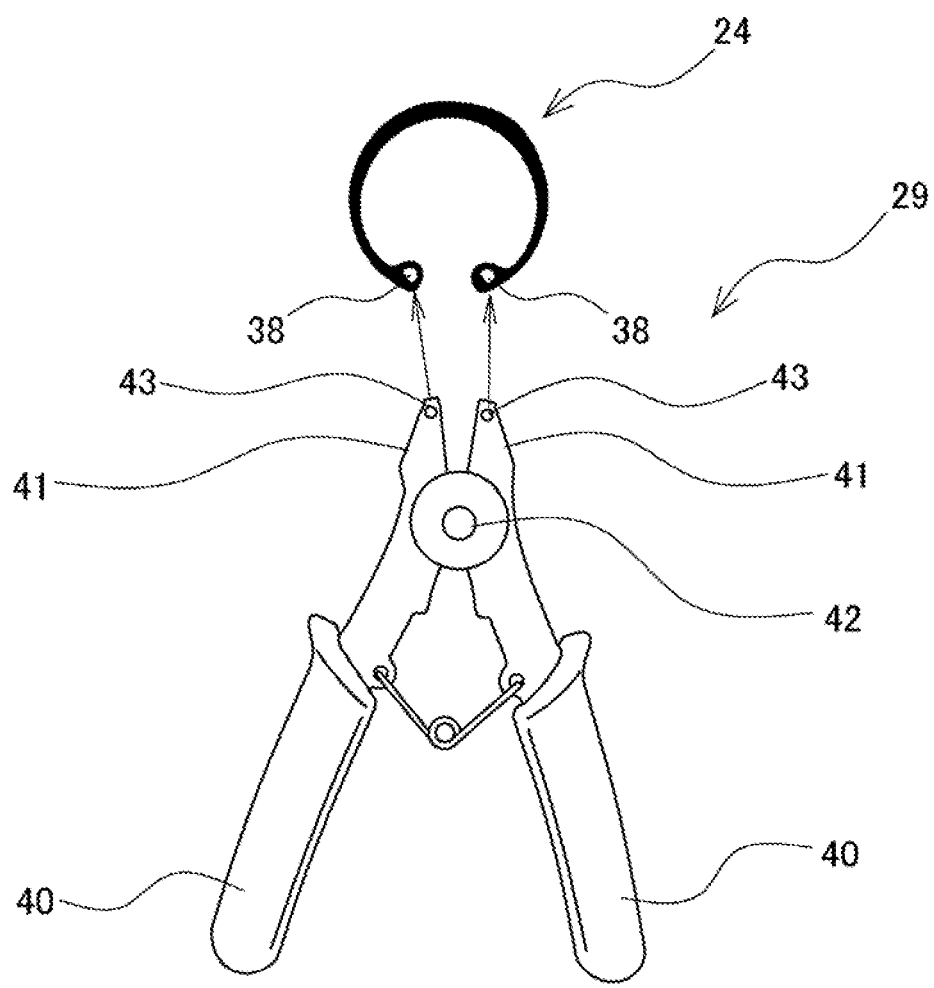
FIG. 5 is a front view illustrating a form of the snap ring and the setting tool.

At the third step, the snap ring 24 is attached into the annular groove 21 using the setting tool 29. FIG. 5 illustrates the snap ring 24 and a form of the setting tool 29 (which may also be referred to as a snap ring plier) for use in attaching the snap ring 24. The snap ring 24 is in a C-shape, which is a shape of a circle having a notch. The snap ring 24 has a tool hole 38 in each of tip ends with the notch interposed therebetween. The setting tool 29 includes handle portions 40, which are open such that a clearance between the handle portions 40 increases toward distal ends thereof, and a pair of the engaging portions 41. The handle portions 40 and the engaging portions 41 pivot about a pivot 42. When the handle portions 40, which are open, are squeezed with hand so as to close the handle portions 40, the engaging portions 41 pivot in the directions that narrow a clearance between the engaging portions 41. Each of the pair of engaging portions 41 has a pin 43 extending in the same direction as an axis of the pivot 42. The pins 43, each having a shape of a cylinder of a predetermined length, are slightly smaller in diameter than the tool holes 38 of the snap ring 24.

To attach the snap ring 24 into the annular groove 21, each of the pins 43 is fitted into a corresponding one of the two tool holes 38. In the rolling bearing device 11, the flange portion 31 has an outer diameter larger than an inner diameter of the snap ring 24, and faces the entire or a part of the snap ring 24 in the axial direction. Accordingly, as illustrated in FIG. 4A, the setting tool 29 is inserted into a clearance between the housing 12 and the flange portion 31 from radially outside of the housing 12.

When the handle portions 40 of the setting tool 29 are squeezed with hand with each of the pins 43 fitted into the corresponding one of the two tool holes 38, the tip ends, between which the notch is interposed, elastically approach each other to reduce an outside diameter of the snap ring 24. The snap ring 24 is inserted inside the housing 12 with the outside diameter of the snap ring 24 reduced to be smaller than an inner diameter D on the open side in the axial direction of the housing 12. Subsequently, squeeze of the setting tool 29 is released at a position corresponding to the annular groove 21. This causes the outside diameter of the snap ring 24 to elastically return to its original size, and the snap ring 24 is fitted into the annular groove 21 (see FIG. 4B).

According to the first embodiment, the annular groove 21 communicates with the recess 25. This allows attaching the snap ring 24 into the annular groove 21 while keeping the snap ring 24 and the engaging portions 41 in proximity of each other in the axial direction as illustrated in FIG. 4B. Hence, according to the first embodiment, when a height h of the pins 43 in the axial direction is at least equivalent to the thickness t of the snap ring 24, it is possible to catch and hold the snap ring 24 with the setting tool 29 and attach the snap ring 24 into the annular groove 21. At this time, at least a part of the engaging portions 41 of the setting tool 29 is accommodated inside the recess 25 of the housing 12.

As can be seen from FIG. 4A, the setting tool 29 is inserted between the snap ring 24 and the flange portion 31. To attain this, a clearance S in the axial direction between the end face 18 of the housing 12 and the flange portion 31 is set to be larger than a sum of the thickness t of the snap ring 24 and a height H of the setting tool 29. The height H of the setting tool 29 is a dimension of the setting tool 29 in the axial direction including the pins 43 and the engaging portions 41.

Figure 6:
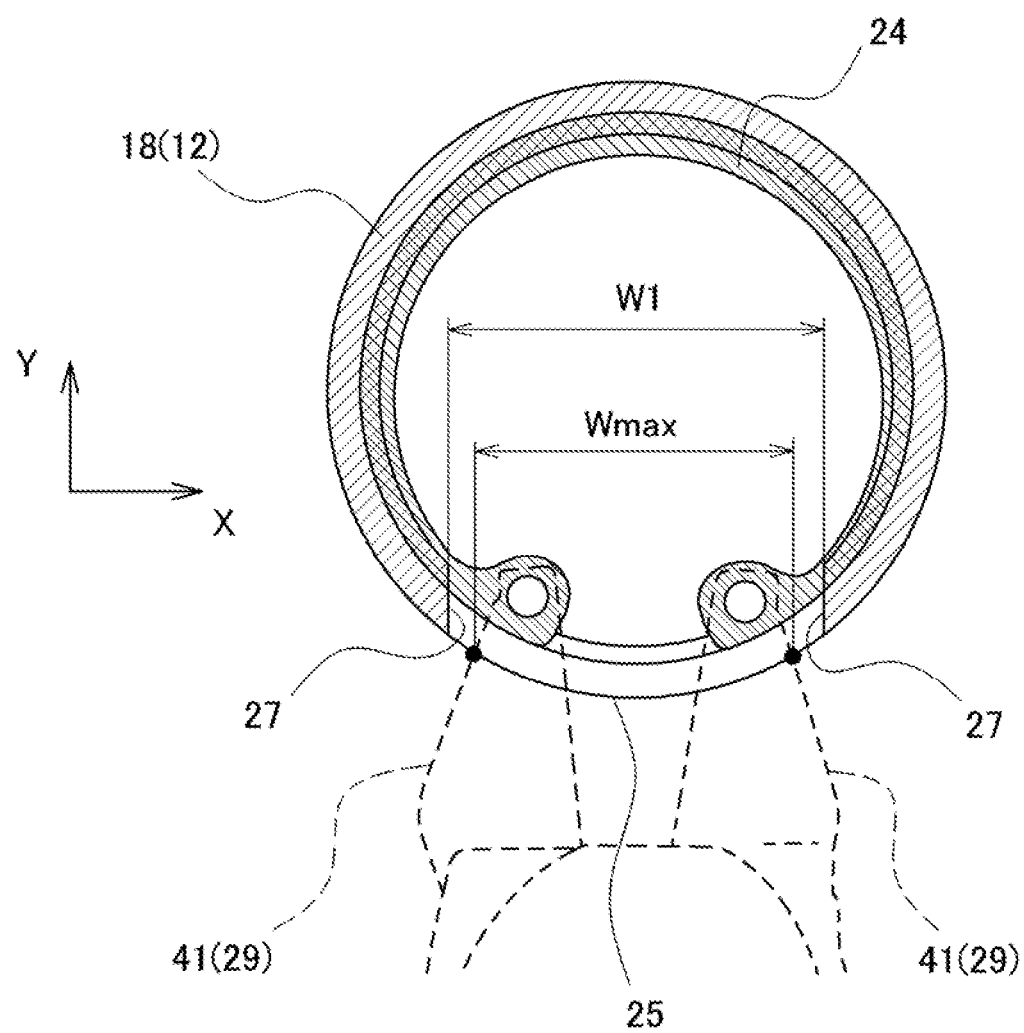
FIG. 6 is a schematic diagram illustrating a state where the snap ring and the setting tool depicted in FIG. 4B are engaged.

FIG. 6 is a schematic diagram, as viewed in the axial direction, illustrating a state where the setting tool 29 and the snap ring 24 indicated in FIG. 4B are engaged with each other. In FIG. 6, the end face 18 excluding the recess 25 is hatched for clarity of the form of the end face 18. According to the first embodiment, the recess 25, which is recessed in the axial direction, is provided in the end face 18 of the housing 12. The width W1 of the recess 25 is larger than a width Wmax of the setting tool 29. Accordingly, at least a part of the engaging portions 41 of the setting tool 29 is accommodated inside the recess 25 when the snap ring 24 is inserted to a position of the annular groove 21. Hence, the first embodiment can reliably prevent interference between the setting tool 29 and the housing 12. The width Wmax of the setting tool 29 is a maximum value of the dimension of a portion of the setting tool 29 corresponding to the recess 25 in an X direction, provided that a Y direction is the direction from a center of the notch of the snap ring 24 to the central axis m, and the X direction is the direction perpendicular to the X direction in FIG. 6.

As can be understood from the above description, according to the first embodiment, the pins 43 can be engaged in the snap ring 24 when the height h of the pins 43 in the axial direction is set to be at least equivalent to the thickness t of the snap ring 24. Accordingly, the height H of the setting tool 29 can be reduced, which increases allowance of space in the axial direction when the setting tool 29 is inserted into the clearance S. Hence, easy attachment of the snap ring 24 and reduction of interference of the setting tool 29 with, for example, the flange portion 31 can be achieved.

To further clarify the advantages of the invention, a procedure for attaching the snap ring 24 is described below on an assumption that the recess 25 is not provided in the end face 18 of the housing 12 or, in other words, that the housing 84 of the structure of the related art is used (hereinafter referred to as "the related structure").

Figure 7A:
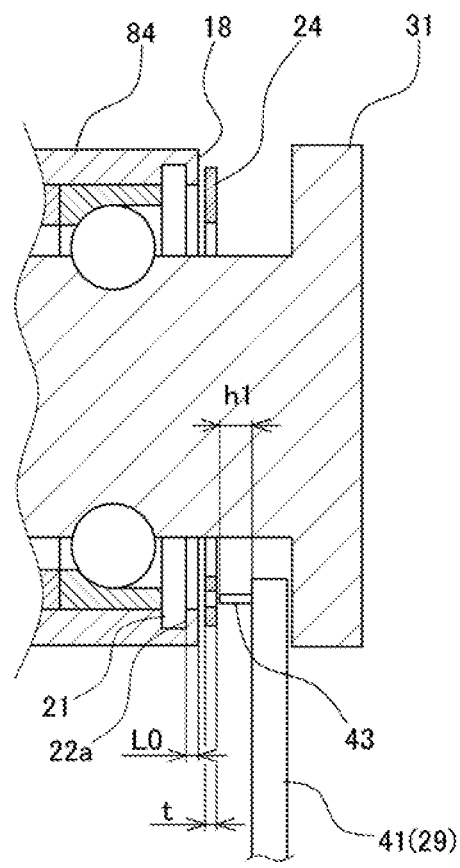
FIGS. 7A and 7B are explanatory drawings describing positions of the snap ring and the setting tool at a third step of an assembly procedure according to a structure of the related art.
Figure 7B:
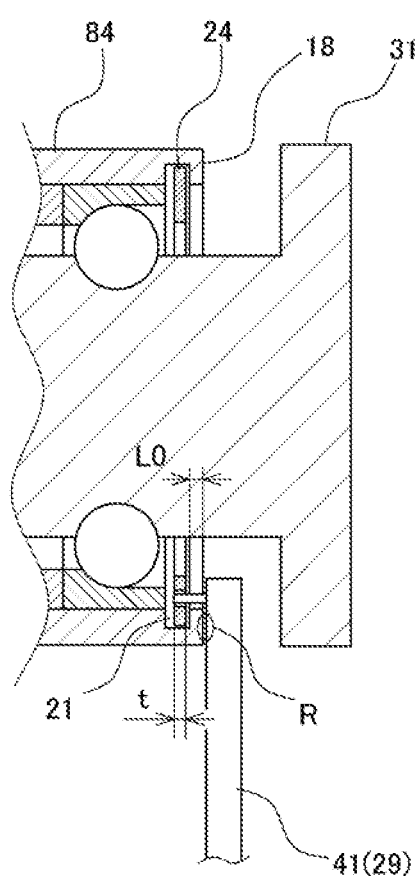

FIGS. 7A and 7B are explanatory drawings describing positions of the snap ring 24 and the setting tool 29 at a third step of an assembly procedure for the related structure. FIG. 7A illustrates a state where the engaging portion 41 of the setting tool 29 is inserted between the housing 84 and the flange portion 31. FIG. 7B illustrates a state where the snap ring 24 is mounted into the annular groove 21. In the related structure, the housing 84 does not have the recess 25, or an equivalent thereof, of the first embodiment. Accordingly, the setting tool 29 interferes with the end face 18 of the housing 84 at the position indicated by R in FIG. 7B when inserting the snap ring 24 to the position of the annular groove 21. This arises a need of setting a height h1 of the pins 43 in the axial direction to be at least larger than a sum of the thickness t of the snap ring 24 and the distance L0 in the axial direction between the end face 18 and the groove side face 22a on the open side in the axial direction of the annular groove 21 so that the snap ring 24 can be inserted to the position of the annular groove 21.

By contrast, according to the first embodiment, as described above, it is required only to set the height h of the pins 43 in the axial direction to be at least equivalent to the thickness t of the snap ring 24. Accordingly, the rolling bearing device 11 using the housing 12 of the first embodiment allows reduction of the height H of the setting tool 29 for use in attaching the snap ring 24. Hence, allowance is provided to the space in the axial direction when the setting tool 29 is inserted between the housing 12 and the flange portion 31. This enables easy attachment of the snap ring 24 even when the space for inserting the setting tool 29 is small. Furthermore, because interference between the setting tool 29 and adjacent components can be reduced, reduction in dents and chipping of adjacent components can be achieved.

When there is allowance of the space for inserting the setting tool 29, the flange portion 31 may be located closer to the housing 12. This reduces the distance in the axial direction between the first bearing 14 and the target 82. As a result, axial displacement of the target 82, which may occur when the temperature of the rolling bearing device 11 increases, can be reduced.

Figure 8A:
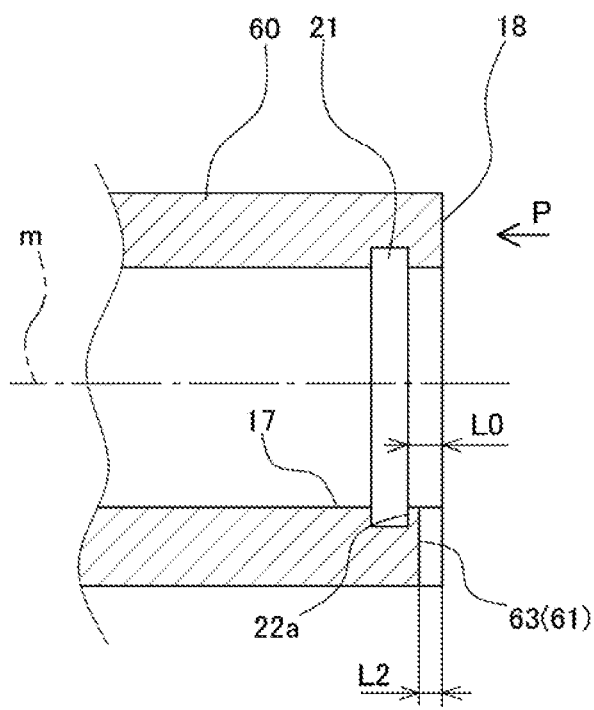
FIG. 8A is an enlarged axial sectional view of main parts of a housing alone according to a second embodiment.
Figure 8B:
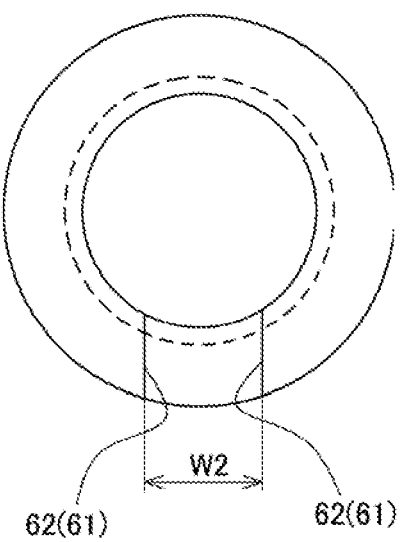
FIG. 8B is a side view of FIG. 8A as viewed in the direction of arrow P.

A rolling bearing device 59 (not illustrated) according to a second embodiment of the invention is described. FIG. 8A is an enlarged axial sectional view of main parts of a housing 60, which is used in the rolling bearing device 59, alone. FIG. 8B is a side view of the housing 60 as viewed in the axial direction along an arrow P. Also in the housing 60, a recess 61, which is recessed in the axial direction, is provided at at least one circumferential position in the end face 18 of the housing 60. The housing 60 differs from the housing 12 of the first embodiment in depth of the recess, which is denoted by the reference numeral 25 in the first embodiment and by the reference numeral 61 in the second embodiment. Except for the recess, the housing 60 is similar in configuration to the housing 12 of the first embodiment. Hereinafter, elements of the second embodiment that are common with those of the first embodiment are denoted by identical reference numerals.

The recess 61 communicates with inside of the housing 60 and extends in the radial direction along the end face 18. The recess 61 is defined by a pair of side faces 62 and 62 that are parallel to a plane containing the central axis m and a bottom face 63 that is parallel to the end face 18. A width W2 (which is a clearance between the pair of side faces 62 and 62) of the recess 61 is larger than the width Wmax of the setting tool 29 for use in attaching the snap ring 24. A depth L2 (which is a distance in the axial direction between the end face 18 of the housing 60 and the bottom face 63) of the recess 61 is larger than the distance L0 in the axial direction between the end face 18 of the housing 60 and the groove side face 22a on the open side in the axial direction of the annular groove 21. Hence, according to the second embodiment, the recess 61 does not communicate with the annular groove 21.

Figure 9A:
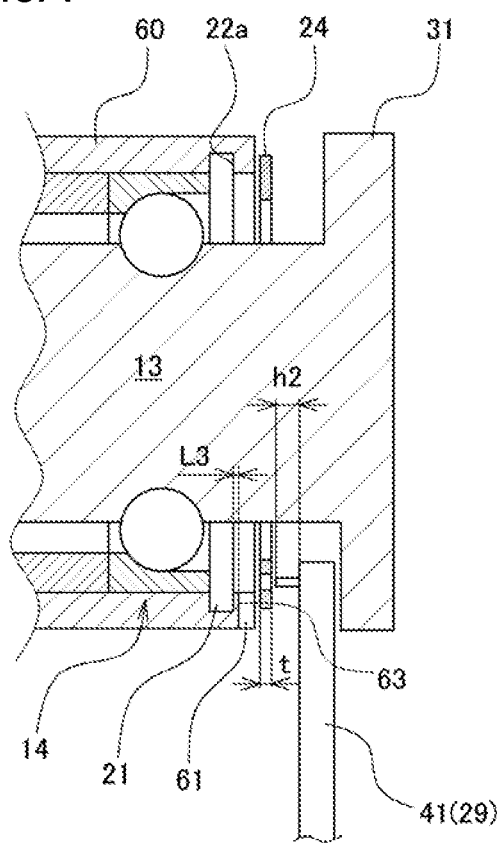
FIGS. 9A and 9B are explanatory drawings describing positions of the snap ring and the setting tool at a third step of an assembly procedure according to the second embodiment.
Figure 9B:
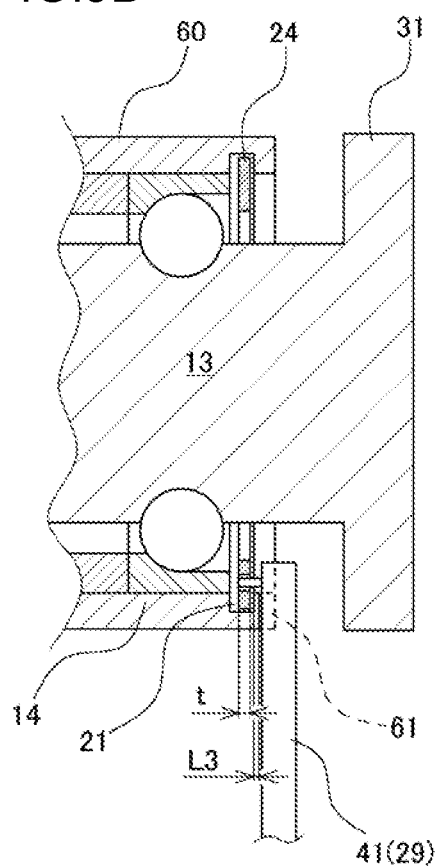

An assembly procedure for attaching the snap ring 24 using the housing 60 of the second embodiment is described. As are FIGS. 4A and 4B, FIGS. 9A and 9B are explanatory drawings describing positions of the snap ring 24 and the setting tool 29 at a third step of the assembly procedure. FIG. 9A illustrates a state where the engaging portion 41 of the setting tool 29 is inserted between the housing 60 and the flange portion 31. FIG. 9B illustrates a state where the snap ring 24 caught and held by the setting tool 29 is mounted into the annular groove 21. Also in the second embodiment, as in the first embodiment, a sub-unit is assembled by mounting the first bearing 14 and the second bearing 15 to the rotary shaft 13. Thereafter, the snap ring 24 is attached into the annular groove 21.

In the housing 60, the recess 61 and the annular groove 21 do not communicate with each other. For this reason, a height h2 of the pins 43 in the axial direction is set to be at least larger than a sum of the thickness t of the snap ring 24 and a distance L3 in the axial direction between the bottom face 63 of the recess 61 and the groove side face 22a on the open side in the axial direction of the annular groove 21 so that the snap ring 24 can be inserted to the position of the annular groove 21.

When the related structure is used, there arises a need of setting the height h1 in the axial direction of the pins 43 to be larger than the sum of the thickness t of the snap ring 24 and the distance L0 (L0>L3) in the axial direction between the end face 18 and the groove side face 22a on the open side in the axial direction of the annular groove 21. Accordingly, the rolling bearing device 59 of the second embodiment allows reduction of the height H of the setting tool 29 for use in attaching the snap ring 24 by the depth L2 (see FIG. 8A) of the recess 61 as compared to that of the above-described related structure. Hence, according to the second embodiment, allowance is provided to the space in the axial direction when the setting tool 29 is inserted between the housing 60 and the flange portion 31. This enables easy attachment of the snap ring 24 even when the space for inserting the setting tool 29 is small. Furthermore, this can prevent interference between the setting tool 29 and adjacent components, such as the flange portion 31, to thus reduce dents and chipping.

Furthermore, also in the rolling bearing device 59 of the second embodiment, each of the bearings 14 and 15 is biased by the spring 39 in the axial direction. Accordingly, the snap ring 24 is pressed against the groove side face 22a on the open side in the axial direction of the annular groove 21. In the housing 60 of the second embodiment, the recess 61 and the annular groove 21 do not communicate with each other. Accordingly, the groove side face 22a on the open side in the axial direction is continuous around an entire circumference. Hence, the snap ring 24 is supported in the axial direction by the groove side face 22a around the entire circumference of the groove side face 22a. Therefore, the first bearing 14 is reliably supported in the axial direction by the snap ring 24 by making contact therewith. As a result, displacement of the target 82 can be reduced further effectively.

When there is allowance of the space for inserting the setting tool 29, the flange portion 31 may be located closer to the housing 60. This allows reduction of the length of the rotary shaft 13 extending from the housing 60 to the target 82. As a result, axial displacement of the target 82, which can occur when the temperature of the rolling bearing device 59 increases, can be reduced.

In the above description of the embodiments, the housing has a cylindrical outer circumferential surface; however, the shape of the housing is not limited thereto. Although not illustrated, the housing may alternatively be configured such that the housing is a rectangular prism in exterior shape and has a cylindrical inner circumferential surface extending through the rectangular prism in an orientation perpendicular to any one of sides of the rectangular prism. The rolling bearing device has been described by way of example, in which the inner raceway surfaces are directly formed on the rotary shaft. However, the structure of the rolling bearing device is not limited thereto. Alternatively, a structure, in which each of the first bearing and the second bearing is a rolling bearing having an inner ring and an outer ring with the inner ring pressed into the outer circumference of the shaft portion of the rotary shaft, may be employed. It is to be understood that the invention is not limited to the above-described embodiments, and various other modifications can be made.

According to the invention, even when the space for inserting a setting tool for attaching a snap ring to a rolling bearing device is small, the snap ring can be attached easily, and interference between the setting tool and adjacent components can be reduced. Furthermore, because interference between the setting tool and adjacent components can be reduced, dents and chipping of adjacent components can be reduced.

What is claimed is:

1. A bearing housing comprising:
a cylindrical inner circumferential surface having an inner side, on which an outer ring of a rolling bearing is fitted into the inner circumferential surface coaxially with the inner circumferential surface; and
an end face formed continuously with an axial end of the inner circumferential surface in an orientation perpendicular to a central axis of the inner circumferential surface, wherein
the inner circumferential surface has an annular groove radially outwardly recessed around an entire circumference of the inner circumferential surface at a position away from the end face in an axial direction on a side of the end face relative to the rolling bearing,
a snap ring is attached into the annular groove to reduce displacement of the rolling bearing toward the end face, the snap ring including tool holes for engagement with pins of a setting tool for use in attaching the snap ring, and
only one recess recessed in the axial direction and extending in a radial direction is provided in the end face to suppress interference between the end face and the setting tool.

2. The bearing housing according to claim 1, wherein a width of the recess is larger than a width of a portion of the setting tool which corresponds to the recess when the setting tool is used to attach the snap ring.

3. The bearing housing according to claim 2, wherein a distance in the axial direction from the end face to a bottom face of the recess is larger than a length in the axial direction between the end face and one side face of a pair of side faces formed in the radial direction to define the annular groove, the one side face being on a side of the end face relative to the other one of the side faces, and the recess and the annular groove communicate with each other.

4. A rolling bearing device comprising:
the bearing housing according to claim 3; and
a rotary shaft mounted to the bearing housing coaxially with the bearing housing and radially inside the bearing housing and rotatably supported by the rolling bearing, wherein
the rotary shaft includes a shaft portion supported inside the bearing housing by the rolling bearing and a flange portion formed at a shaft end of the shaft portion in one piece with the shaft portion, and
the flange portion is of such a size that the flange portion axially faces at least a part of the snap ring.

5. A rolling bearing device comprising:
the bearing housing according to claim 2; and
a rotary shaft mounted to the bearing housing coaxially with the bearing housing and radially inside the bearing housing and rotatably supported by the rolling bearing, wherein
the rotary shaft includes a shaft portion supported inside the bearing housing by the rolling bearing and a flange portion formed at a shaft end of the shaft portion in one piece with the shaft portion, and
the flange portion is of such a size that the flange portion axially faces at least a part of the snap ring.

6. A rolling bearing device comprising:
the bearing housing according to claim 1; and
a rotary shaft mounted to the bearing housing coaxially with the bearing housing and radially inside the bearing housing and rotatably supported by the rolling bearing, wherein
the rotary shaft includes a shaft portion supported inside the bearing housing by the rolling bearing and a flange portion formed at a shaft end of the shaft portion in one piece with the shaft portion, and
the flange portion is of such a size that the flange portion axially faces at least a part of the snap ring.

7. A bearing housing comprising:

a cylindrical inner circumferential surface having an inner side, on which an outer ring of a rolling bearing is fitted into the inner circumferential surface coaxially with the inner circumferential surface; and an end face formed continuously with an axial end of the inner circumferential surface in an orientation perpendicular to a central axis of the inner circumferential surface, wherein the inner circumferential surface has an annular groove radially outwardly recessed around an entire circumference of the inner circumferential surface at a position away from the end face in an axial direction on a side of the end face relative to the rolling bearing, a snap ring is attached into the annular groove to reduce displacement of the rolling bearing toward the end face, a recess recessed in the axial direction and extending in a radial direction is provided in the end face to suppress interference between the end face and a plier tool for use in attaching the snap ring by engaging tool holes in the snap ring, the plier tool having, as viewed from the axial direction, (i) a narrow width in the recess in a position in which the snap ring is compressed and (ii) a maximum width Wmax in the recess, wider than the narrow width, in a position in which the plier tool engages the tool holes and the snap ring is fully engaged in the annular groove, and the recess is wider, as viewed from the axial direction, than the maximum width Wmax.

* * * * *